Feb. 13, 1968     N. R. BROWNYER     3,368,648
FLOATING CAM BRAKE HAVING BRAKE SHOE LININGS
OF DIFFERENT VOLUMES Filed March 28, 1966     5 Sheets-Sheet 1

INVENTOR.
Nelson R. Brownyer

BY

ATTORNEYS

Feb. 13, 1968 N. R. BROWNYER 3,368,648
FLOATING CAM BRAKE HAVING BRAKE SHOE LININGS
OF DIFFERENT VOLUMES
Filed March 28, 1966 5 Sheets-Sheet 3

FIG. 8

INVENTOR
NELSON R. BROWNYER

BY Strauch, Nolan, Neale,
Nies & Bronaugh
ATTORNEYS

Feb. 13, 1968  N. R. BROWNYER  3,368,648
FLOATING CAM BRAKE HAVING BRAKE SHOE LININGS
OF DIFFERENT VOLUMES
Filed March 28, 1966  5 Sheets-Sheet 4

FIG. 9  FIG. 11

INVENTOR
NELSON R. BROWNYER
BY
Strauch, Nolan, Neale,
Nies & Bronaugh
ATTORNEYS

Feb. 13, 1968  N. R. BROWNYER  3,368,648
FLOATING CAM BRAKE HAVING BRAKE SHOE LININGS
OF DIFFERENT VOLUMES
Filed March 28, 1966  5 Sheets-Sheet 5

INVENTOR

NELSON R. BROWNYER

BY Strauch, Nolan, Neale,
Nies & Bronaugh
ATTORNEYS

# United States Patent Office 3,368,648
Patented Feb. 13, 1968

3,368,648
FLOATING CAM BRAKE HAVING BRAKE SHOE LININGS OF DIFFERENT VOLUMES
Nelson R. Brownyer, Birmingham, Mich., assignor to Rockwell-Standard Corporation, Pittsburgh, Pa., a corporation of Delaware
Continuation-in-part of application Ser. No. 364,689, May 4, 1964. This application Mar. 28, 1966, Ser. No. 551,818
16 Claims. (Cl. 188—78)

This application is a continuation-in-part of copending application, Serial No. 364,689 filed May 4, 1964, for Floating Cam Brake With Oppositely Thick and Thin Brake Shoe Linings, now abandoned, which is a continuation of application, Serial No. 93,717 filed March 6, 1961, now abandoned.

This invention relates to brakes for automotive vehicles and in particular to a wear compensating cam operated internally expanding wheel brake.

The vehicle brakes with which the present invention is primarily concerned are of the fixed anchor type and comprise a pair of brake shoes pivotally mounted at one end on a spider or backing plate within a surrounding drum. The brakes are operated by a rotatable S cam disposed between the free ends of the brake shoes. To apply the brakes the cam is rotated by an actuator, usually an air operated diaphragm motor, to spread the free ends of the shoes apart and force them against the surrounding drum.

In such brakes, one shoe is oriented so that any given point of the drum rotates from the free end of the shoe toward its pivot point. This shoe is called the primary shoe. The other shoe which is oppositely oriented is called the secondary shoe. The primary brake shoe usually does more work or braking than the secondary shoe due to the wrapping-up or self-applying action created by the rotating drum, which action carries the primary brake shoe towards the anchor pin and into the drum. On the other hand, the secondary brake shoe tends to be rotated away from the anchor pin and therefore its effective braking effort amounts only to that supplied by the actuating force. Theoretically, this self-energizing effect of the primary shoe increases its effective braking effort because of the induced wrapping action which creates pressure between the brake drum and the brake shoe in addition to that transmitted to the brake shoe by the actuating device but, in actual practice, it has been found that the self-energizing effect of the primary shoe in a fixed anchor type brake cannot be utilized to its fullest extent due to the fixed position of the actuating device. Consequently, it has been proposed to provide floating actuators which position themselves during operation.

In a cam operated brake a floating cam will produce a greater stopping ability than one with a fixed location cam, or, in other terms, by incorporating a floating actuator a smaller power input will produce the desired stopping ability. Consequently, the actuator chamber or brake lever length, or both, may be smaller than in a comparable brake having a fixed cam location. However, difficulties have been encountered to produce a satisfactory cam shaft support for a floating cam actuator due to its relative length, and the present invention is concerned with overcoming these and other problems.

Another important disadvantage encountered in fixed anchor type brakes is the greater amount of wear on the primary brake shoe lining than on the secondary shoe lining due to the aforesaid reasons. The wear tendency is such that in the early stage the primary shoe lining wears faster than the secondary up to an amount determined by the clearance and deflections of the parts involved. After the initial uneven wear, further progressive wear on the primary and secondary brake shoe linings is substantially equal because of the positive location of the camshaft. When the brake lining on the primary shoe is completely worn there remains some lining on the secondary shoe. Both shoes must be re-lined, however, since the cam throw determines the maximum amount of lining that can be worn off any shoe.

To overcome the foregoing disadvantages in more or less conventional cam operated fixed anchor type brakes, the present invention provides a brake having a floating cam and a proportioned lining capacity that will allow twice the nominal wear on the primary shoe of conventional brakes which closely approaches an ideal condition. This is accomplished by incorporating an extremely thick lining on the primary shoe and a correspondingly thinner lining on the secondary shoe. Initial actuation of the floating cam starts from an off center position and, as lining wear takes place on the primary shoe, the cam will progressively move towards a normal center in the direction of primary brake shoe actuation. A unidirectional automatic adjustment mechanism is provided to compensate for the increased lining wear on the primary shoe.

While brakes of this type may be oriented in any desired manner, they are usually mounted with the pivot or anchor points slightly above the center line of the axle and the cam slightly below the center line to permit mounting the motor in a protected location. In such an installation the brake shoes are positioned one above the other. Accordingly, when the brakes are released the shoes are gravity urged toward the lower part of the drum, and, unless they are restrained against downward movement, the lower shoe will drag on the drum with resulting heat build-up and accelerated wear and deterioration of the brake and drum.

With the foregoing considerations in mind it is an important object of the present invention to provide a novel automatic adjustment and shoe positioning mechanism for floating cam brakes which, as lining wear progresses, maintains the shoes in a desired relationship to the drum and maintains the lower shoe out of contact with the drum when the brakes are released.

It is a further object of the present invention to provide a cam operated fixed anchor type vehicle brake in which the combined brake linings will wear a total thickness substantially twice the normal wear of the primary shoe of conventional cam operated brakes.

Another object of the present invention is the provision in a novel cam operated vehicle brake of a primary brake shoe having an extremely thick lining and a secondary brake shoe having a much thinner lining to compensate for unequal lining wear.

Still another object of the invention is the provision of a floating rotatable cam, the axis of which initially starts from a position off center toward the secondary shoe and progressively advances towards the geometrical center of the assembly as the brake shoe lining wears on the primary shoe.

A still further object of the present invention is the provision of novel bracket and brake support constructions to support a floating cam and cam shaft in a fixed anchor type vehicle brake.

Another object is to provide an improved automatic centralizer for a floating cam brake which is adaptable to both a spider supported or backing plate supported brake mechanism.

It is another object of the present invention to provide means for holding the shoes and cam actuator in fixed position when the brakes are released to prevent damage to the brake components due to vibration and road shock.

Another object of the present invention is the provision of novel unidirectional self-adjusting means to maintain the shoes in proper position when the brake shoe lining has worn.

Still another object is the provision of a fixed anchor type, cam actuated brake with two brake shoes having linings of different thickness and a floating cam to augment the self-energizing effect of one of the brake shoes and thereby produce a desired stopping ability with a smaller power input and prolong the lining life.

It is a further object of the invention to provide an automatic wear compensating brake assembly wherein thicker linings are used on the primary shoe, the shoes are automatically adjusted to compensate for wear and the brake actuation floats under control of the automatic adjustment to maintain optimum association with the brake shoes.

Figure 1:
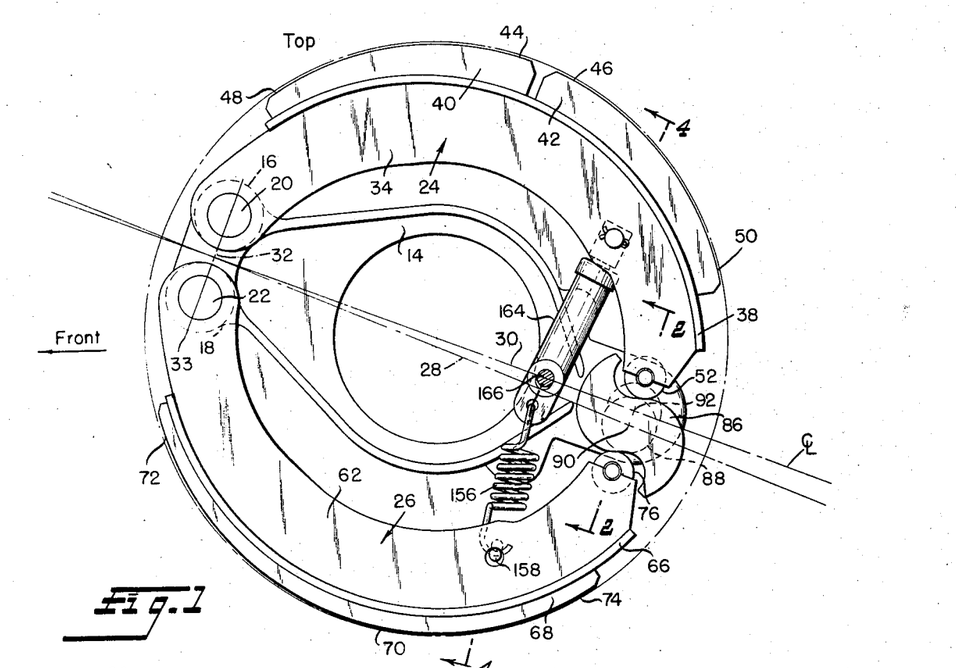
FIGURE 1 is a diagrammatic side elevation of an internally expanding brake according to one embodiment of the present invention.

Other objects and features will become apparent from the following description in connection with the appended drawings which illustrate certain preferred embodiments of the present invention and in which:

FIGURE 1 illustrates an internally expanding shoe brake according to the present invention and shown in a position of an actual installation in a vehicle. The top of the brake in this specific embodiment is as indicated and the forward direction of the vehicle is indicated by the legend and arrow.

The brake in FIGURE 1 comprises a brake support plate or spider 14 which may be rigidly secured to the vehicle axle (not shown) in any known manner and which is provided at one end with adjacent aligned bosses 16 and 18 for fixed pins 20 and 22 on which are pivotally supported the anchor ends of a primary brake shoe 24 and of a secondary brake shoe 26. These brake shoes are of identical construction although reversed in the assembly. The brake shoes 24 and 26 according to the present invention are designed and initially installed in the brake around a centerline indicated at 28 which is offset from the actual brake or spider geometrical centerline indicated at 30 towards the secondary brake shoe 26. Both centerlines 28 and 30 intersect at a point 32 which is in the center of a transverse line 33 drawn through the centers of anchor pins 20 and 22. During the course of successive application of the brake, the brake shoe centerline 28 will progressively advance towards the spider centerline 30 swinging about point 32 due to lining wear on the primary brake shoe 24 as will become more apparent later on in this description.

Primary brake shoe 24 is preferably composed of a dual web construction comprising parallel web members 34 and 36 (FIGURE 2) which are jointly secured to the inside of a curved table 38 in any known manner. Secured to the outside of table 38 are a pair of brake shoe linings 40 and 42 which, as shown in the drawings, are extremely thick for a purpose to be explained and which slightly taper from their adjacent ends 44 and 46, respectively, toward the opposite ends 48 and 50, respectively, so that their greatest thickness is at the center of the brake shoe where the travel and wear is greatest to compensate for increased wear at this point. The actuating end of the brake shoe 24 receives a cam follower roller 52 which is barrel shaped (FIGURE 2) and has two oppositely outwardly extending cylindrical trunnions 54 and 56 which are rotatably secured in corresponding cylindrical sockets 58 and 60 of the shoe webs 34 and 36 so that the barrel shaped roller 52 is free to rotate about its own axis between the webs.

The secondary brake shoe 26 comprises duel parallel web members 62 and 64 which are jointly secured to the inside of a curved table 66. Attached to the outside of table 66 is a brake shoe lining 68 which is extremely thin as compared to the brake shoe linings 40 and 42 of brake shoe 24 and which likewise slightly tapers in thickness from its mid-portion 70 toward opposite ends 72 and 74 for the same purpose as explained in connection with linings 40 and 42. In a typical case the linings 44 and 46 on the primary shoe may be about twice as thick as the lining 68 on the secondary shoe.

The actuating end of brake shoe 26 receives a barrel shaped cam follower roller 76 (FIGURE 2) which has two oppositely outwardly extending cylindrical trunnions 78 and 80 rotatably secured in corresponding cylindrical sockets 82 and 84 of the webs 62 and 64 so that the roller 76 may freely rotate about its axis between the webs opposite roller 52.

Figures 2, 3:
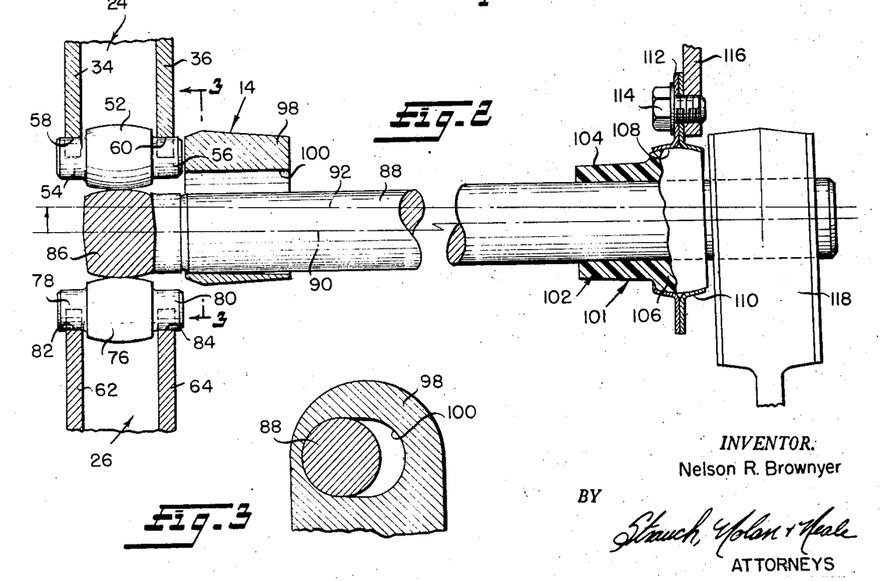
FIGURE 2 is an enlarged transverse cross-section through the actuating mechanism of the brake in FIGURE 1 substantially along line 2—2 of FIGURE 1.
FIGURE 3 is a cross-section through the camshaft and support along line 3—3 of FIGURE 2.

With further reference to FIGURES 2 and 3, between the brake shoe rollers 52 and 76 and in abutting relationship thereto is located a symmetrical S-shaped cam 86 which is integral with or otherwise rigidly secured to a cam shaft 88 extending outwardly from the brake and substantially normal to the plane of the centerline 30 of the brake. However, it will be noted from FIGURE 1 that the axis of the cam shaft 88 is initially offset from the actual geometrical centerline position indicated at 90 in FIGURE 2 to progressively work counterclockwise in FIGURE 1 towards a centerline position 92 of FIGURE 2 in the direction of brake shoe application and following the wear adjusted position of the primary brake shoe 24. The inner end of camshaft 88 is rotatably supported in the spider 14 in an integral boss 98 having an oblong constant width aperture 100 (FIGURE 3) which extends in the direction of the brake shoe application force. The width of the aperture 100 is substantially equal to the diameter of the camshaft so that the camshaft is restricted from movement other than rotative and substantially linear along the length of the aperture which is in an arc about point 32, and the length of the oblong aperture 100 corresponds to the travel of the camshaft from its initial position when the brake is new to a position in which the brake shoe lining is worn off.

The other or outer end of the camshaft 88 is preferably supported for rotation in a universal bearing assembly 101 comprising a bushing of synthetic plastic material 102 having an extended hub section 104 and flange section 106. Flange section 106 comprises a radial convex shaped surface 108 which is confined in a socket assembly 110 of a sheet metal bracket 112 for universal pivotal self-adjusting purpose as illustrated in FIGURE 2. For a detailed description of such a self-adjusting bearing and socket member per se, see U.S. Patent No. 2,923,579 issued to W. F. Scheel. In an open brake camshaft assembly having spaced bearing supports, it has been found that the above described bearing support will be best suited due to its self-adjusting feature, durability and corrosion and heat resistance. Bearing support bracket 112 may be secured as by screws 114 to a flange 116 or any other member to be attached to the vehicle axle or frame (not shown). The camshaft 88 is provided adjacent the outer bearing assembly 101 with the usual brake lever 118 adapted to rotate camshaft 88 upon manual, hydraulic or pneumatic actuation.

The brake lever 118 is connected to the shaft 88 by a slack adjuster mechanism, not shown, which may be manual or may be of the automatic type, as shown for example, in U.S. Patent 3,154,178. The slack adjuster mechanism is effective to vary the angular position of the cam shaft relative to the lever when the brake lining wears so as to advance the retracted position toward the drum without changing the position of the lever 118 so that the lever travel remains constant during brake actuation regardless of lining wear.

Figures 4, 5, 6, 7:
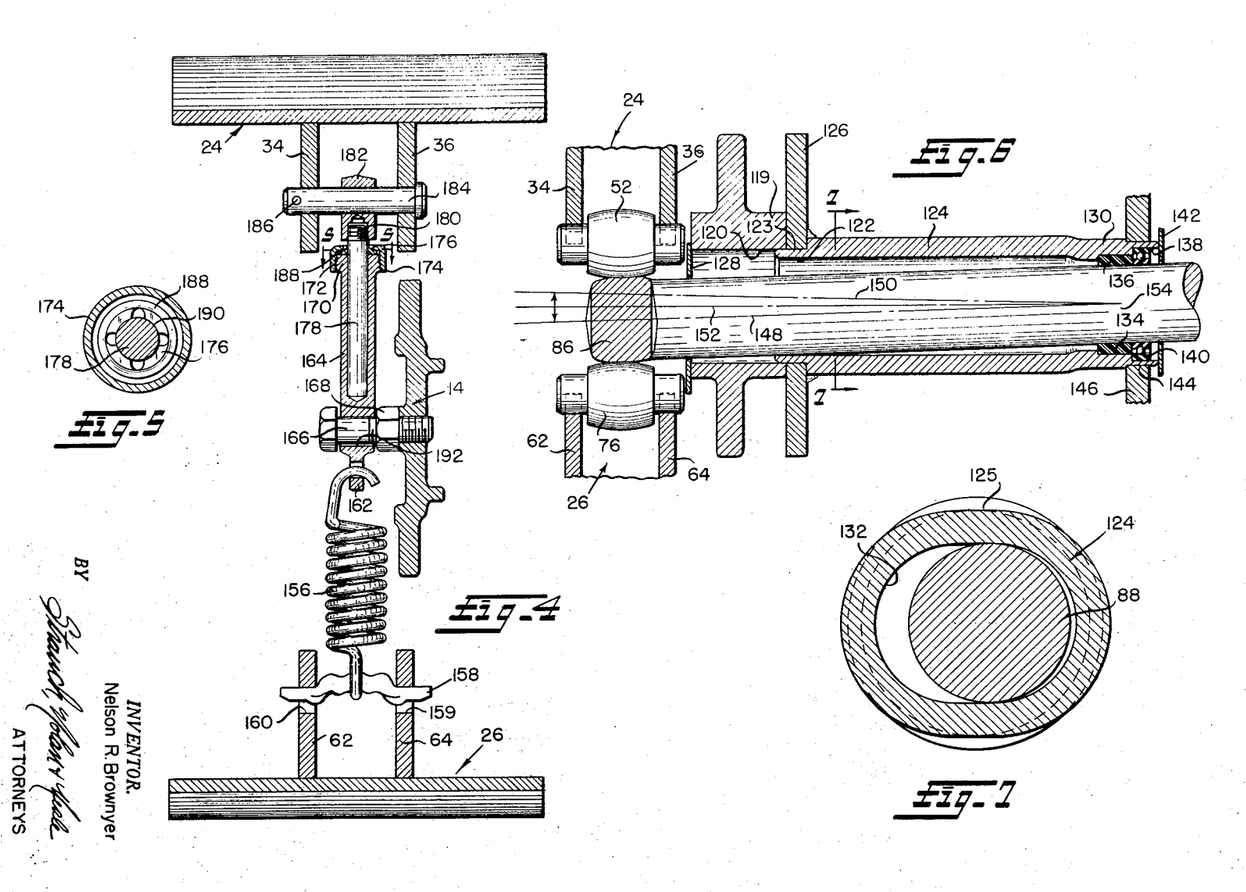
FIGURE 4 is another enlarged transverse cross-section through the brake of FIGURE 1 along line 4—4.
FIGURE 5 is a still more enlarged cross-section through the adjusting mechanism of FIGURE 4 along line 5—5 of FIGURE 4.
FIGURE 6 is a section like FIGURE 2, but shows another embodiment of camshaft support in accord with the present invention.
FIGURE 7 is an enlarged cross-section through the camshaft and support along line 7—7 of FIGURE 6.

A modified camshaft support is illustrated in FIGURES 6 and 7 which show a wholly enclosed camshaft assembly. In this embodiment a slightly different spider boss 119 has an aperture 120 into which extends the recessed inner pilot end 122 of a tubular member 124. Adjacent the outer surface of spider boss 119 is a support flange 126 which may be ring-welded to the recessed end 122 of the tubular member 124 to firmly support it against the spider boss 119. Adjacent the inner surface of spider boss 119 is a spring washer 128 supported around camshaft 88 and which closes aperture 120 against the brake interior to prevent foreign matter from entering the aperture and tubular member 124. Tubular member 124 is flattened as indicated at 125 in FIGURE 7 from adjacent the recessed inner end section 122 to a distance short of the outer end section 130 to provide an oblong interior bore 132 (FIGURE 7).

Aperture 120 in spider boss 119 is concentric with the outer diameter 123 of the pilot end 122 and serves to pilot the tube 124 in the spider. The oblong interior 132 of the tube 124 is of such dimension that the camshaft is supported approximately along its entire length between the ends but free to rotate and move only in the direction of brake shoe application. The internal diameter of the cylindrical outer end section 130 is recessed as at 134 to receive a bushing 136 which may be of plastic or other synthetic material and in which camshaft 88 is journalled for rotation. A still larger recess 138 adjacent bushing 136 receives a sealed bearing 140. Another spring washer 142 around the outer end of camshaft 99 closes the tubular member 124 towards the outside and prevents damage to the seal and bearing assembly. The outer surface of the cylindrical outer end section 130 is also recessed as at 144 to receive a flange or bracket 146 which provides a mounting means for the air or hydraulic actuator of the self supporting camshaft tube. A brake lever (not shown, similar to the one in FIGURE 2 will be attached to the outer end of camshaft 99 to affect rotation thereof.

As illustrated in FIGURE 6 the initial position of the camshaft 88 is on an offset centerline 148 and gradually advances towards a centerline 150 when the brake shoe lining on the primary shoe 24 wears. Numeral 152 indicates the normal geometrical centerline of the tubular support 124 and all three, initial and adjusted centerline, intersect at a point 154 which is the radial and axial center of the bushing or bearing 136 which therefore becomes the pivot location of camshaft 88. Bearing 136 may be self-adjusting or comprise a slightly resilient plastic bushing since angular displacement of the camshaft at the pivot point is very limited.

In brakes of this type, provision is made to return and retain the brake shoes in the off position, usually by means of a return spring. In addition, means may be provided to center and locate the brake shoes to prevent them from tilting. Furthermore, adjusting means may be incorporated to maintain proper clearance between the brake shoes and drum as the linings wear off.

In the present invention the aforesaid means are combined into one cooperating mechanism which comprises a relatively short return coil spring 156 attached at one end to a corrugated spring pin 158 inserted between the brake shoe webs 62 and 64 of the secondary brake shoe 26 through holes 159 and 160. A detailed description of the preferred corrugated spring pin 158 which allows the coil spring 156 to firmly hold the brake shoe 26 in centered position due to the unique construction of the pin will be found in U.S. Patent No. 2,928,506 issued to L. Goldman. The other end of the coil return spring 156 is attached to the extension 162 of a tubular member 164 which is pivotally mounted by means of a bolt 166 on the spider 14 radially inwardly of the cam 86 and on the geometrical brake centerline 30 (FIGURE 1). An adjusting nut 168 on bolt 166 between the tubular member 164 and the spider surface allows correct alignment of the tubular member 164 and coil spring 156 and subsequently the brake shoes 24 and 26.

The other end of the tubular member 164 which contains the automatic adjusting mechanism is open and has an enlarged head section 170 provided with external threads 172 onto which is screwed a stamped nut 174 which may be staked at assembly to prevent loosening thereof. The nut 174 is provided with an aperture 176 through which a rod 178 frictionally extends into the tubular member 164 with a slight press fit. The outer end of rod 178 is threaded as at 180 to receive a clevis 182 which is pivotally supported on a pin 184 extending through both webs 34 and 36 of the forward brake shoe 24 and which may be secured by a cotter pin 186 or other means to prevent accidental disassembly.

The nut 174 clamps a spring washer 188 which surrounds the rod 178 against head 170 of tubular member 164. The internal diameter of spring washer 188, which is slightly less than the diameter of the rod 178, is not continuous but comprises a number of tangs 190 (FIGURE 5) which are placed under compression during assembly and slightly bent upwards due to their reduced diameter with respect to the rod 178 and therefore frictionally press against the surface of the rod with such force and in such direction that movement of the rod 178 outwardly of the tubular member 164 is comparatively easy, but return movement will be effectively prevented due to the tangs 190 biting into the rod surface. The nominal brake shoe clearance is maintained by the slightly elongated hole 192 at the pivot connection of tubular member 164 with stationary bolt 166 and this dimension is constantly maintained by the aforedescribed adjusting mechanism.

The present novel brake operates in the following manner: The initial assembly is such that the camshaft 88 is positioned on the off-centerline 90 (FIGURE 2) which intersects the offset initial brake shoe working centerline 28 (FIGURE 1) at the line of brake shoe actuation. At this time rod 178 is at its innermost position within member 164, and the shoes are held retracted by spring 156.

When the camshaft 88 is rotated for brake actuation, the peripheral surfaces of the cam 86 engage the barrel shaped surfaces of the rollers 52 and 76 thereby pivotally displacing the brake shoes 24 and 26 through equal angles outwardly against the brake drum. Due to the tendency of the primary shoe 24 to be drawn against the drum and thereby become self-energizing, as explained earlier, and its tendency to do more work as required by the input force, the present invention provides extremely thick linings on this forward shoe and comparatively thinner linings on the rear shoe. The wear on the linings 40, 42 of the primary shoe is at the beginning more rapid up to a point where lining wear on both shoes becomes substantially equal until the entire brake linings on both shoes are worn off at the same time.

Any wear on the primary brake shoe 24 will be consequently compensated for by the one-way automatic adjustment mechanism at 164 which operates in such a way that when the brake lining of brake shoe 24 wears and a larger than normal stroke of the cam 86 is required to apply the brakes, the rod 178 will be drawn outwardly of the tubular member 164 a corresponding amount in which position it will be held against return by the biting tangs 190 of the spring washer 188, so that, although the return spring 156 will return the primary brake shoe only the predetermined amount defined by the dimension of the elongated hole 192 at the pivot of the tubular member 164, the increased strut length from the side of slot 192 in contact with pivot 166 relocates the linings 40, 42 further outwardly toward the drum. The larger than normal stroke of the cam also produces through the automatic slack adjuster a new at rest position of the cam. A manual slack adjuster may be adjusted from time to time to produce the same result.

The return spring 156 urges the secondary shoe roller 76 against the cam 86 which is thus forced into firm contact with the roller 52 of the primary shoe. The axis of the cam is thus gradually shifted toward the primary shoe as wear progresses. The shifting movement and the total shoe clearance are reduced by the action of the slack adjuster. From the time of initial application of the brake until the brake linings are completely worn off, the floating cam and camshaft are adapted and caused to follow the adjusted outward displacement of the primary brake shoe 24 upon each wear adjustment. Also, the adjustment prevents the upper shoe from urging the cam and the lower shoe against the drum when the brakes are released, the spring 156 being of sufficient strength to overcome the weight of the cam and the lower shoe. The floating position of the cam further enhances the achievement of better braking effect with the same amount of power input.

Figure 8:
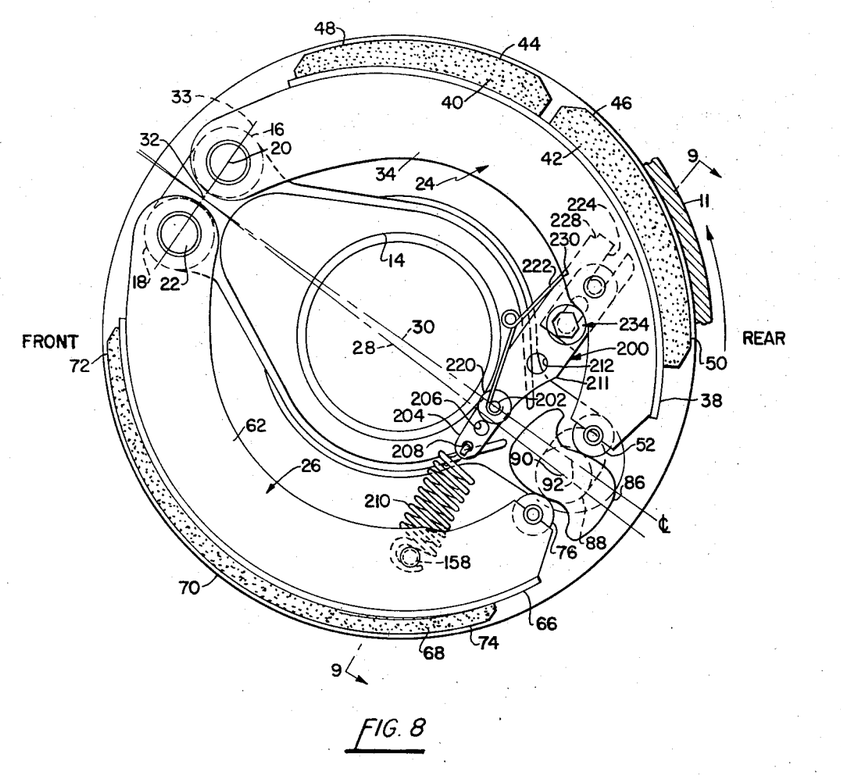
FIGURE 8 illustrates a second and presently preferred embodiment of the invention.
Figure 9:
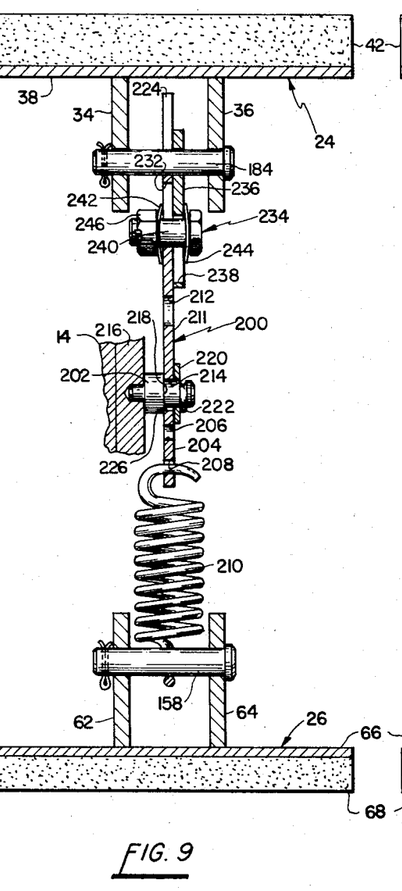
FIGURE 9 is a section taken along 9—9 of FIGURE 8 on the axis of the centralizer assembly.

FIGURES 8 and 9, to which reference will now be made, illustrate the preferred form of the adjuster assembly installed in a brake assembly which is otherwise identical to the brake of FIGURE 1. The modified adjuster comprises in general a normally rigid strut assembly 200 pivotally secured at 202 to the spider 14 of the brake. The strut has a reduced end extension 204 provided with spaced holes 206 and 208. A coil return spring 210 is attached at one end to the strut extension 204 by means of the hole 208 nearest the end of the extension and at its other end the spring extends between the brake shoe webs 62 and 64 of brake shoe 26 and is attached to a pin 158 supported in the webs thus providing a resilient connection between the brake shoe 26 and the centralizer strut.

The strut 200 is composed of an elongated flat member 211 of which the extension 204 is a part. Member 211 is provided with two holes 212 and 214 spaced and offset from each other at predetermined locations which serve as selective pivoting attachment points for the strut 200 and, in this instance, the strut is pivotally attached through hole 214 to a pivot stud 202 fastened to the spider 14. The pivot stud 202 is threaded into a reinforcement member 216 welded to the spider in close proximity to the axle. The surface 218 of stud 202 provides an aligned abutment and support for the strut 200 to keep the strut in an exact aligned position normal to the axis of the axle. The strut is held on the stud 202 by a washer 220 and spring 222.

The elongated flat member 211 of the strut extends from its pivot 202 towards the primary brake shoe 24 and between the brake shoe webs 34, 36 thereof. The end of the flat member 211 is bifurcated in its longitudinal direction by an elongated open slot 224 by which the member 211 extends around the brake shoe pin 184 extending through and secured to both web members 34, 36. As shown in FIGURES 8 and 9, in its initial position the brake shoe pin 184 bottoms in the slot 224 and the hole 214 by which the flat member 211 is secured to the pivot stud 202 is slightly larger than the diameter of the stud to provide a clearance 226 of a dimension corresponding to the normal clearance at the primary shoe.

The flat member 211 is provided at one side with predeterminedly spaced notches 228 and 230 one at its end and the other one spaced farther inward to be selectively used to attach the wire spring 222. In this instance, one end of the spring is attached to the inward notch 230 and the other end to the stud 202.

Adjacent the open slot 224 the member 211 is provided with an elongated hole 232 through which extends a bolt and nut assembly 234 by which an adjusting plate 236 is attached to the flat member 211 in parallel abutting relationship therewith. The adjusting plate 236 has an opening through which the brake shoe pin 184 passes and at its other end is provided with an elongated hole 238 through which the bolt and nut assembly 234 extends. As shown in FIGURE 9 in the initial position of the centralizer the bolt 240 of the bolt and nut assembly 234 bottoms in the elongated hole 232 of member 211 and is positioned at the opposite end of the elongated hole 238 of the adjusting plate 236.

To allow restricted, uni-directional, longitudinal movement between the member 211 and adjusting plate 236 in order to elongate the strut assembly 200 in the direction towards the brake drum when lining wear occurs, Belleville spring friction washers 242 and 244 are provided to abut outer surfaces of the member 211 and adjusting plate 236 and thus frictionally retain the members 211 and adjusting plate 236 against longitudinal movement relative to each other as long as no force is exerted on the two members exceeding the friction force of the washers 242, 244, which is adjustable by means of tightening or loosening the nut 246 of the bolt and nut assembly 234.

Upon brake actuation, that is, rotation of cam 86 (in counterclockwise direction in FIGURE 8) the brake shoes will be forced outwardly in opposite directions to abut the brake drum 11 against the force of the return spring 210 and the spring 222. The strut 200 moves through a distance equal to the clearance 226 provided at hole 214 since the friction lock provided by the assembly 234 is several times stronger than the opposing spring forces. Normally when this clearance is taken up, both brake shoes are in solid engagement with the drum and no relative elongating movement in the strut 200 takes place, the brake shoes being returned to their initial position by the return spring 210 upon release of the brake application force. However, when wear occurs on the brake lining of the shoe 24 to which the centralizer is attached, the shoe has to move through a greater distance than that provided by the clearance 226. The adjusting plate 236 is forced to move outwardly in relation to the flat member 211 which is prevented from further movement by its connection to the stud 202. The movement of the adjusting plate 236 is made possible by the elongated holes 232 and 238 and the elongated open slot 224.

Upon release of the brake actuating force the return spring 210 tends to return the brake shoes to their initial position. However, return of the shoe 24 is limited by the clearance 226 at the strut pivot 202. Thus, the original clearance between the primary brake shoe and the brake drum is reestablished.

It will be noted that in its returned position the primary shoe 24 is displaced slightly in a counterclockwise direction about its pivot 20 from its initial position and a roller 52 is returned to a position slightly elevated as viewed in FIGURE 8. Thus, the return spring 210, which is sufficiently strong to overcome the weight of the lower shoe 26 and the cam 86, returns the lower shoe solidly against the cam and urges the cam upwardly until it comes to rest solidly against the upper roller 52. Thus, the brake shoe return spring 210 automatically shifts the floating cam and shaft assembly. It will be appreciated that the action of a slack adjuster, either automatic or manual, which continually resets the at-rest position of the cam 86 in successive counterclockwise increments decreases the shifting movement of the cam and the lower shoe. More specifically, in the absence of a slack adjuster the axis of the cam is repositioned in amount equal to the amount of lining wear on the primary shoe 24. With a slack adjuster the axis of the cam is shifted a lesser amount. Under all circumstances, however, the lower shoe is held away from contact with the lower portion of the brake drum in the brake released position.

The floating cam arrangement in addition to its ability to reposition itself provides a better balanced, more effective braking action with less power input than a non-floating cam brake of comparable size.

Figure 10:
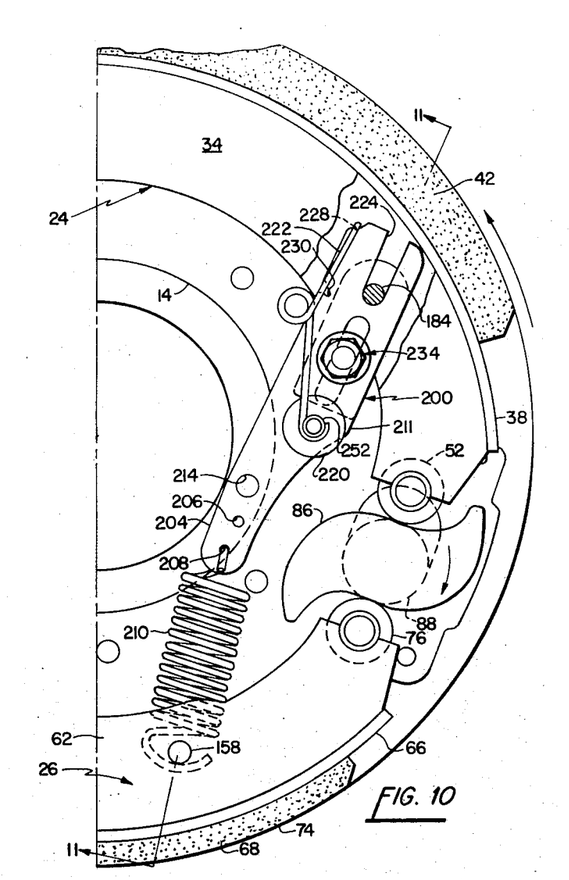
FIGURE 10 is a view similar to FIGURE 8 but illustrating the equalizer assembly installed in a brake supported on a removable spider.
Figure 11:
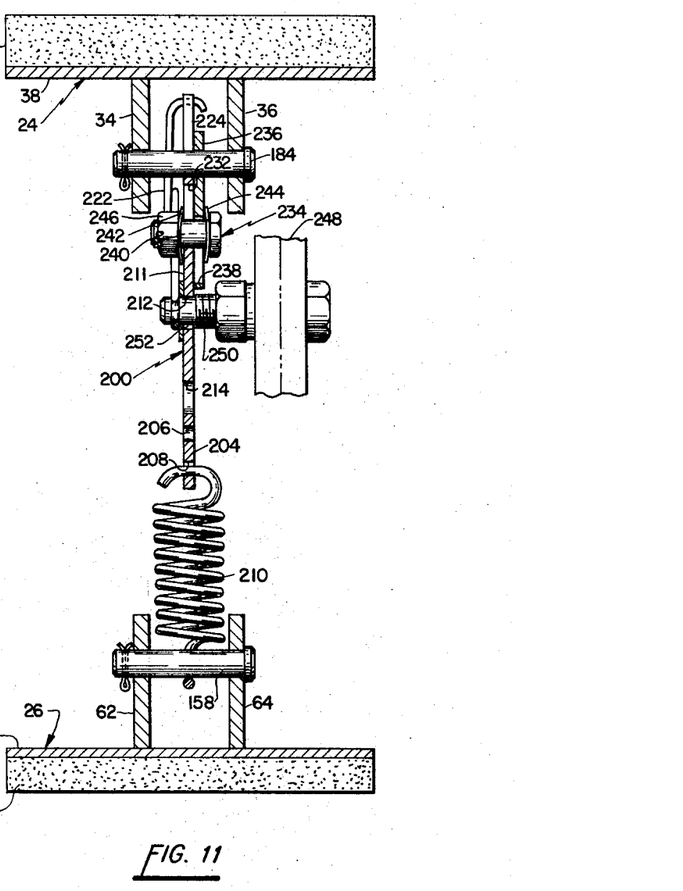
FIGURE 11 is an enlarged section taken along line 11—11 of FIGURE 10.

FIGURES 10 and 11 illustrate the installation of the centralizer 200 on a removable spider 248 rather than on an integral spider support shown in FIGURES 8 and 9.

In this instance the flat strut member 211 is pivotally supported on a stud 250 using the alternate pivot hole 212 due to the different structure of the spider.

Since pivot hole 212 is nearer to the brake shoe end of the strut the wire spring 222 has also to be repositioned and is attached in this instance to the outer notch 228 to enable the other end of the wire spring to be attached to the relocated pivot point 250.

Pivot hole 212 is slightly larger than the diameter of the pivot stud 250 to provide a clearance 252 of a dimension corresponding to the normal clearance between the lining of the primary shoe and the drum for the same purpose as described above.

It will be noted that the cam 86 (FIGURE 8) is installed to rotate in a direction opposite to the direction in which the cam 86 of FIGURE 10 rotates. This has no influence on the function of the centralizer but further enhances the universal adaptability of the present novel brake and centralizer structure functioning equally well whether the cam rotates with or against drum rotation.

As mentioned above an actual installation may require the brake assembly to be rotated in either direction from the position illustrated in the drawings so that either the primary shoe 24 or secondary shoe 26 is positioned on top. If the primary shoe 24 with the thicker lining is on top the installation of the centralizer will be as shown in FIGURES 1, 8 and 10, that is, the centralizer strut is attached to the primary shoe and the return spring is attached to the secondary shoe 26.

Figure 12:
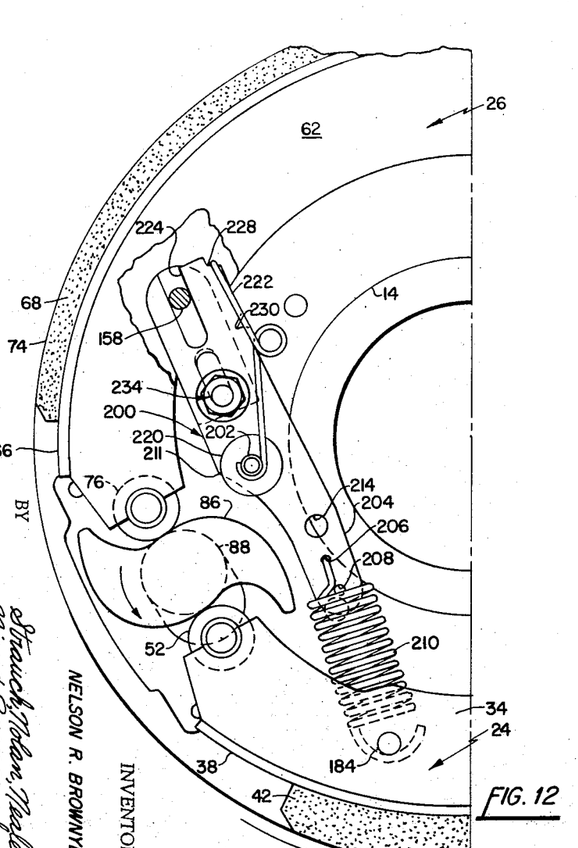
FIGURE 12 illustrates the equalizer assembly installed in reversed position and attached to the secondary shoe.

In the FIGURE 12 embodiment the brake is installed so that the secondary shoe 26 with the thinner lining is on top. The centralizer 200 is connected to the secondary shoe and the return spring 210 is connected to the primary shoe 24 to prevent the weight of the top shoe from moving the cam 86 and camshaft 88 in its elongated hole 100 and thereby pressing the primary shoe into the brake drum.

Because of the shorter distance between the brake shoe pin 184 of the primary shoe 24 and the centralizer strut 200 due to the thicker lining on the primary shoe, the return spring 210 is connected to the centralizer at the second hole 206. At the other end of the strut because of the longer distance between the brake shoe pin 158 of the secondary shoe 26 and the pivot 202 due to the thinner lining on shoe 26, the plate 236 of the strut assembly is advanced outwardly in relation to the member 211 so that the friction bolt assembly 234 bottoms at the inner end of the elongated hole 238 of the adjusting plate 236. Further adjustment due to lining wear on the secondary shoe 26 is made possible by the provision of the elongated hole 232 in member 211 which allows the friction bolt and friction washer assembly 234 to slide for further advancement of the adjusting plate 236 outwardly.

When the camshaft is rotated in a counterclockwise direction, the cam 86 spreads the brake shoes 24, 26 apart against the drum. If the linings are unworn there is no change in the relative position of the centralizer strut 200 and the cam actuator. However, when lining wear occurs the brake shoes must move through a greater distance causing the cam to be rotated through a larger angle and causing the effective length of the strut 200 to be increased. Since the amount of lining worn off the secondary shoe 26 will be less than that worn off the primary shoe 24, only a small amount of elongation takes place between the adjusting plate 236 and the strut member 211. Upon release of the brake actuating force the secondary brake returns to a position determined by the strut 200. The rotated position of the cam 86 is adjusted by the automatic slack adjuster. The spring 210 lifts the lower primary shoe which comes to rest when the cam 86 is in contact with each of the rollers 52 and 76. As wear progresses the cam 86 and camshaft 88 are forced to move within the elongated camshaft hole in the direction of the primary shoe 24 an amount proportional to the amount of lining worn off of the primary shoe in excess of that worn off the secondary shoe. This function will be repeated consecutively as the linings wear down until the cam 86 is completely repositioned on or near the actual centerline of the brake as described in connection with FIGURE 1 at which time both the thicker primary and thinner secondary shoe lining will have worn down to an equal amount. During the repeated advance of the primary shoe towards the brake drum, the return spring 210 will gradually expand. However, this has no adverse effect on the return spring force or other normal operating functions of the device.

The spring 222 incorporated in the preferred embodiments of the invention constantly urges strut 200 toward the position shown in FIGURES 9 and 11, i.e., with the upper side of the opening 214 or 216 held firmly against the associated pivot pin 202 and 250.

It has been found that in the absence of the spring, normal road shock and vibration causes the strut 200 to bounce on the pin which after a period of time causes peening of the pin, elongation of the opening 214 or 216, and, because of the constant hammering effect, may lead to accelerated deterioration of the entire brake assembly. Actual experience has shown that the spring 222 effectively eliminates this difficulty and greatly extends the life of the mechanism.

The foregoing contemplates brake shoes of essentially the same materials or wear quality on both the shoes. The invention also contemplates employing brake linings of different wear characteristics on the primary and secondary shoes to accomplish a more near alike degree of wear of the two brake linings. For example, the secondary shoe lining material could be of extremely high friction material, appreciably higher than the primary shoe lining which would result in more work being done by the secondary shoe and hence the secondary shoe lining would wear out faster than it would if it were of the same material as the primary shoe lining. This would provide a more even wear on both linings.

Thus, the present invention provides by its improved centralizer a better and more effective use of a floating cam type brake as herein disclosed. In cooperation with the linings of unequal thickness and a floating cam which has the ability to reposition itself towards the centerline of the brake a more efficient use is made of the lining material than hitherto possible in conventional floating cam type brakes.

As illustrated and described in the specification the centralizer is universally applicable to either a spider or a backing plate supported brake and for attachment to either the primary or the secondary shoe by the provision of dual pivot holes; dual return spring attachment holes and dual notches for the wire spring on the strut member.

The present invention may be embodied in other forms without departing from the characteristic or essential spirit thereof, therefore, the present embodiments are to be considered as illustrative only and not restrictive, the scope of the invention being indicated by the appended claims rather than by the foregoing description.

What is claimed and desired to be secured by Letters Patent is:

1. In a vehicle brake assembly characterized by a brake drum and a support having at least two brake shoes pivotally mounted on said support on fixed axes at one of their ends, cam means positioned between the other ends of said brake shoes and adapted to be actuated to move said shoes toward drum engagement, means rigid with said support for mounting and guiding said cam means for floating displacement substantially in the direction of movement of said other ends of said shoes, return spring means for moving said shoes away from said drum to an inactive position, one of said shoes constituting a primary shoe and the other of said shoes a secondary shoe, said primary shoe being provided with a brake lining of predetermined thickness initially larger than the thickness of the lining of said secondary shoe, and frictional adjusting means connected between said support and one of said shoes progressively effective as the lining wears to arrest return movement of said one shoe close to said drum to thereby automatically provide constant spacing between said one shoe and said brake drum as the lining on said one shoe wears, said floating cam means being initially located on the side of a geometric brake centerline opposite to the end of said primary shoe and said floating cam means being adapted to move toward said primary shoe as brake lining wear progresses.

2. For use in combination in a vehicle brake assembly wherein primary and secondary brake shoes are pivotally mounted on fixed axes at one of their ends on a support and a floating cam positioned between the other ends of said brake shoes is mounted on said support for displacement substantially in the direction of movement of said other ends of said shoes and adapted to be actuated to move said shoes toward drum engagement with return spring means for moving said shoes away from a drum to an inactive position, and wherein automatic adjusting means is progressively effective to directly control return movement of one of said shoes to automatically compensate for lining wear to provide constant spacing between said brake drum and the lining on said one shoe with said floating cam being initially located on the side of a geometric brake centerline opposite to the adjacent end of the primary brake shoe and automatically following the adjusted position of the primary shoe towards the brake drum under brake lining wear: a specially coacting pair of primary and secondary friction brake linings for installation on said primary and secondary brake shoes, respectively, the thickness of said primary lining being initially appreciably greater than the thickness of said secondary lining.

3. In a vehicle wheel brake assembly of the type characterized by a brake drum and a support on which primary and secondary brake shoes having linings thereon of different volumes are rockably mounted at one end, a floating actuating mechanism disposed between the other ends of said shoes, and an automatic actuator position adjustment assembly connected between said shoes, said combination assembly comprising a unidirectionally extensible strut pivoted intermediate its ends on a strut support pivot carried by said support, and pivotally connected at one end to one of said brake shoes, and a tension spring connected to the other end of said strut and the other of said brake shoes.

4. In the brake assembly defined in claim 3, said strut comprising members one of which is connected respectively to said one shoe and the other of which is connected to said strut support pivot, said members being connected together by friction means which permit elongation of the strut but no relative movement of said members to shorten the strut.

5. In the brake assembly defined in claim 4, wherein said strut support pivot comprises a pivot pin and said member connected to the strut support pivot having an elongated aperture receiving said pin.

6. In the brake assembly defined in claim 3, the pivot mounting of said strut providing a lost-motion connection between said strut and said support pivot to permit said strut to advance said one shoe toward and away from said drum a distance equal to the clearance desired between said drum and said one shoe without elongation of said strut.

7. In the brake assembly defined in claim 6, an additional tension spring connected between one of said strut members and said support pivot to yieldably take up said lost-motion to prevent relative movement between said strut and said pivot support except when said brake is actuated.

8. In a vehicle wheel brake assembly of the type characterized by a support on which primary and secondary brake shoes having linings thereon are mounted at one end on fixed axis pivots, a rotatable actuator cam disposed between the other ends of said shoes, and a combination return spring and automatic shoe position adjustment assembly connected between said shoes, said combination assembly comprising a unidirectionally extensible strut pivoted on said support and connected at one end to one of the brake shoes and a tension spring between the other end of said strut and the other shoe, the brake lining on said primary shoe being initially thicker than the lining on said other shoe, and means floatingly mounting said actuator cam for displacement in the direction of said primary shoe as said primary shoe lining wears thinner.

9. In a vehicle wheel brake assembly of the type characterized by a support on which primary and secondary brake shoes having linings thereon are mounted at one end on fixed axis pivots, a rotatable actuator cam disposed between the other ends of said shoes, and a combination return spring and automatic shoe position adjustment assembly connected between said shoes, said combination assembly comprising a unidirectionally extensible strut pivoted on said support and connected at one end to one of the brake shoes and a tension spring between the other end of said strut and the other shoe, together with means rigid with said support for mounting and guiding said cam for substantially circumferential floating displacement relative to said support in the region between said other ends of said shoes, said cam being initially located on the side of a geometric brake centerline opposite to the end of said primary shoe and moving toward said primary shoe as the lining wears.

10. In a vehicle brake assembly characterized by a brake drum and a support having at least two brake shoes pivotally mounted on said support on fixed axes at one of their ends, cam means positioned between the other ends of said brake shoes and adapted to be actuated to move said shoes toward a drum engaging position, means rigid with said support for mounting and guiding said cam means for floating displacement substantially in the direction of rotation of said brake drum, return spring means for moving said shoes away from said drum to an inactive position, one of said shoes constituting a primary shoe and the other of said shoes a secondary shoe, said primary shoe being provided with a tapered brake lining of predetermined volume initially larger than the volume of the lining on said secondary shoe, and frictional adjusting means connected between said support and one of said shoes progressively effective as the lining on said shoe wears to arrest return movement of said one shoe close to said drum to thereby automatically provide a constant spacing between said one shoe and said brake drum, said floating cam means being initially located offset towards one side of a geometric brake centerline said floating cam means being adapted to move toward said brake centerline in response to lining wear on said one shoe.

11. For use in combination with a vehicle brake assembly having a support and a brake drum wherein primary and secondary brake shoes are pivotally mounted on fixed axes at one of their ends on said support and having an actuator positioned between their other ends mounted for floating displacement substantially in the direction of rotation of said brake drum which is adapted to be actuated to move said shoes toward drum engagement, return spring means for moving said shoes away from said drum to an inactive position, and wherein automatic adjusting means are progressively effective to directly control the return movement of one of said shoes to automatically compensate for lining wear to provide a constant spacing between said brake drum and the lining on said one shoe with said floating cam being initially located on one side of a geometric brake centerline, automatically following the adjusted position of the primary shoe towards the brake drum under brake lining wear: a special coacting pair of primary and secondary brake shoes, respectively, the volume of said primary brake shoe lining being initially appreciably greater than the volume of said secondary brake shoe lining.

12. In a vehicle brake assembly characterized by a brake drum and a support having at least two brake shoes pivotally mounted on said support on fixed axes at one of their ends, cam means positioned between the other ends of said brake shoes adapted to be actuated to move said shoes toward drum engagement, said cam means being mounted for floating displacement substantially in the direction of movement of said other ends of said shoes, return spring means for moving said shoes away from said drum to an inactive position with said other ends of said shoes against said cam, one of said shoes constituting a primary shoe and the other of said shoes constituting a secondary shoe, said primary shoe being provided with a brake lining of predetermined thickness initially greater than the thickness of the lining of said secondary shoe, said cam means being initially located on the side of a geometric brake centerline opposite to the adjacent end of said primary shoe and being adapted to move toward said primary shoe as brake lining wear progresses, and frictional adjusting means progressively effective automatically as the lining wears to shift said inactive position toward said primary shoe to thereby arrest return movement of said primary shoe at a series of positions progressively closer to said drum as wear on the lining on said primary shoe progresses.

13. In a vehicle brake assembly characterized by a brake drum and a support having at least two brake shoe assemblies pivotally mounted on said support on fixed axes at one of their ends, one of said shoe assemblies constituting a primary shoe assembly and the other of said shoe assemblies constituting a secondary shoe assembly, said primary shoe assembly being provided with a tapered brake lining of predetermined volume initially larger than the volume of the lining on said secondary shoe assembly, a cam assembly positioned between the other ends of said brake shoe assemblies and adapted to be actuated to move said shoe assemblies toward a drum engaging position, said cam assembly being mounted for displacement substantially in the direction of movement of said other ends of said shoes, and said cam assembly being initially located on the side of a geometric brake centerline opposite to the adjacent end of said primary shoe assembly and being adapted to move toward said primary shoe assembly as brake lining wear progresses, return spring means for moving said shoe assemblies away from said drum to an inactive position with said other ends of said shoe assemblies against said cam assembly, and frictional adjusting means connected between said support and one of said assemblies progressively effective automatically as the linings on said shoe assemblies wear to shift said inactive position toward said primary shoe.

14. The combination according to claim 13 together with rollers carried by said other ends of said shoe assemblies and wherein said cam assembly comprises a rotatable cam positioned between said rollers for engagement therewith, an actuator shaft having a free end supporting said cam, means supporting said shaft adjacent its opposite end for swinging movement to permit displacement of said cam in the direction of rotation of said brake drum and at least said rollers or said cam being barrel-shaped to accommodate the swinging movement of said actuator shaft.

15. In the brake assembly defined in claim 13 in which the lining on said primary shoe is initially thicker than the lining on said secondary shoe.

16. In the brake assembly defined in claim 13 in which said taper differs in degree from the actuating ends towards the pivot ends of said shoes.

References Cited

UNITED STATES PATENTS

| | | | |
|---|---|---|---|
| 1,932,896 | 10/1933 | Hunt, et al. | 188—78 |
| 2,057,507 | 10/1936 | Weidenbacker | 188—78 |
| 2,074,710 | 3/1937 | Tatter | 188—79.5 |
| 2,345,107 | 3/1944 | Goepfrich | 188—78 |
| 2,459,958 | 1/1949 | Parnell | 188—78 |
| 3,057,439 | 10/1962 | House et al. | 188—196 |
| 3,114,437 | 12/1963 | House | 188—78 |
| 3,195,689 | 12/1965 | Ryskamp | 188—79.5 |

FOREIGN PATENTS 514,571  11/1939  Great Britain.

DUANE A. REGER, *Primary Examiner.*